United States Patent [19]
Bouthors et al.

[11] 3,819,196
[45] June 25, 1974

[54] AUTOMATIC SAFETY HARNESS CONTROL SYSTEM

[75] Inventors: Pierre Bouthors; Alain Dera; André Lefeuvre, all of Billancourt, France

[73] Assignees: Regie Nationale Des Usines Renault, Billancourt; Automobiles Peugeot, Paris, both of, France

[22] Filed: Aug. 31, 1972

[21] Appl. No.: 285,218

[52] U.S. Cl. ............ 280/150 SB, 297/388, 297/389
[51] Int. Cl. ............................................. B60r 21/10
[58] Field of Search ................. 280/150 B, 150 SB; 297/384, 385, 387, 388, 389

[56] References Cited
UNITED STATES PATENTS
3,700,258   10/1971   Wize ............................ 280/150 SB
3,727,944   4/1973   Wize ............................ 280/150 SB Primary Examiner—Philip Goodman
Assistant Examiner—John A. Carroll
Attorney, Agent, or Firm—Stevens, Davis, Miller & Mosher

[57] ABSTRACT

This device for automatically tensioning and releasing a safety harness is responsive to the opening and closing movements of a door of the vehicle.

It comprises a safety harness, a pair of anchoring points thereof, disposed at different levels, at least one point being adjustable, said anchoring points being spaced laterally from the adjacent door of the vehicle, a buckle adapted to slide along said harness, a traction element secured to said buckle, a winder for said traction element, a first guide member rigid with the door and a second guide member movable in relation to said first member and guided thereby, wherein the traction element is adapted to exert a constant tractive effort on second guide member and the winder is secured in a manner known per se to a suitable part of the vehicle.

6 Claims, 9 Drawing Figures

AUTOMATIC SAFETY HARNESS CONTROL SYSTEM

The present invention relates to devices for retaining the drivers and passengers of automotive vehicles by means of safety harnesses or belts, and more particularly to means for automatically tensioning and releasing a safety harness under the control of the closing and opening movements of a door of the vehicle.

It is known that these devices are intended for simplifying to a substantial extent the fitting of the safety harness around the user's body and that they are so designed that the use of this safety harness is compulsory.

This invention is applicable more particularly to devices of the type wherein the anchoring point of the safety harness is connected to the door of the vehicle and movable in relation thereto, and wherein means are provided for modifying the relative position of said anchoring point as a function of the angle of opening of the door, in order to facilitate the stepping in and out of the passengers when said door is open.

Devices of this general type are already known wherein the anchoring points of the strap of the safety harness are rigid with the seat and/or the body of the vehicle, and wherein a sliding buckle carried by said strap is displaceable along a guide member carried by the door.

These devices comprise a strap winding drum so designed that under normal conditions of operation the harness can be elongated against the antagonistic force exerted by a spring or a motor tending to wind up the strap.

Strap winders are secured as a rule to the seat structure, to the roof or the body, or to the door jamb.

On the other hand it is known that the members permitting the sliding movements of the safety harness, which are mounted on the vehicle door, require a certain work for producing the safe travel of the strap along the guide members during the door opening and closing movements. As a rule, this work is accomplished by the passenger himself who actuates the door by means of additional levers or pulleys the movements of which are attended by the automatic upward or downward movement of the strap while releasing the threshold of the vehicle door.

It is the essential object of this invention to provide a device for:

retracting and resetting in operative position safety harnesses of automotive vehicles, wherein one portion of the work necessary for moving the strap along guide means rigid with the vehicle door is performed by power means;

automatically putting the safety harness into service, wherein the strap winder is rigid with the door of the vehicle, whereby the potential energy previously stored by a power member enclosed in the winder is converted into a force for moving the strap along the guide members secured to the vehicle door, whereby the power means operate in the direction to reduce the stress counteracting the strap movement;

causing the movements of a first element of the guide means (said first element consisting essentially of a slideway) during the door closing movement;

putting the safety harness into and out of its operative position, said device being adjustable according to the particular morphological characteristics of the occupant of the seat concerned.

The device of this invention comprises a safety harness or belt, two points for attaching the harness which are disposed at two different levels of which at least one is adjustable and which are spaced laterally in relation to the vehicle door, a sliding buckle on said harness, a traction element secured at one end to said buckle, a winder for winding up said traction member, a first guide member rigid with the door of the vehicle, a second guide member movable in relation to, and guided by, said first guide member, this device being characterised in that said traction element is adapted to exert a permanent traction on said second guide member, and that the traction element winder is secured in a known manner to a suitable portion of the vehicle. A preferred embodiment employs an additional resilient member between the buckle and the second guide member.

Other features and advantages of the device of this invention will appear as the following description proceeds with reference to the attached drawings, in which.

Figure 1:
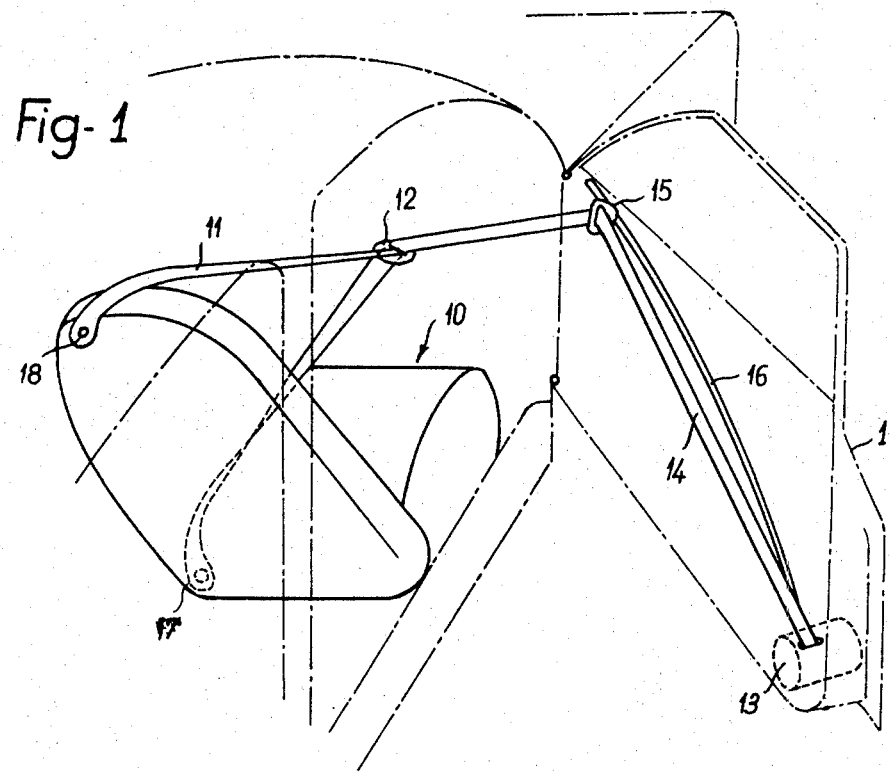
FIG. 1 is a perspective view of the device.

In FIG. 1 there is shown diagrammatically in thick lines a seat 10, a safety harness comprising a shoulder strap 11 in the release position obtained when the adjacent door 1 of the vehicle is open.

The harness is anchored to the vehicle body or to the seat (as in the example illustrated) and adapted to slide in a buckle 12 attached to the winder 13 through a traction element 14 such as a cable, a strap, belt or flexible metal strip normally retracted within the winder 13.

The traction element 14 is illustrated in FIG. 1 to show the position of this element when the door is open.

Figure 2:
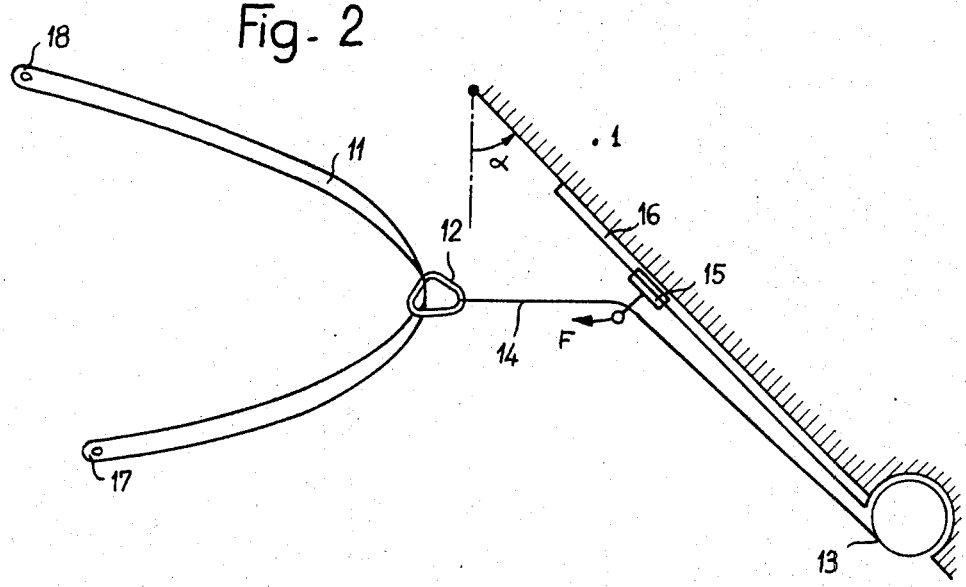
FIG. 2 is a diagrammatic view of the device according to FIG. 1.

In FIG. 2 th door 1 is shown very diagrammatically and the shoulder strap 11 and buckle 12 are connected to a movable guide member 15 displaceable along a fixed slideway or like member 16 secured to the inner panel of door 1. As already mentioned in the foregoing the traction element 14 in this case is partially retracted within the winder 13.

According to a specific feature characterising the harness positioning device the traction element 14 exerts a certain stress on the second movable guide member 15 and tends to move same along the first fixed guide member or slideway 16 during the door opening movement, as a consequence of the resultant F of the forces applied by the traction element 14 on the fixed guide member 16. It is clear that the direction of this resultant F is subordinate both to the angle α of opening of door 1 and to the direction of this angle α.

Under these conditions it will be seen that notwithstanding its simplicity the device illustrated in FIG. 2 permits of automatically positioning the harness during the door closing movement. In fact, the buckle 12 tends to move towards the winder 13 due to the modification occurring in the orientation of the resultant force F and also of the aforesaid angle α.

In the exemplary form of embodiment illustrated in FIG. 1 the safety harness is a shoulder strap having three anchoring points, of which two, 17, 18 are located on the lower and upper portions of the back of the seat. However, it will be seen that this specific arrangement of the anchoring points is not compulsory since other locations may be contemplated therefor, notably on the floor of the vehicle, the head rest, the top of the seat back. Of course, the safety harness or belt may be of any desired type and may also include energy absorbing devices associated with the strap or belt, and means for adjusting the length of the belt elements, such as adjustable buckles and/or winders.

On the other hand, the winder 13 secured to the lower portion of the door is adapted to retain the passenger independently of his stature and of the seat position. According to a known mode of operation the winder comprises a return spring 19 and is adapted to be locked by inertia.

Besides, the two guide members 15, 16 comprise a "carriage" and a track or slideway rigid with the door 1.

To facilitate the relative movements of the two guide members, mechanical, pneumatic or electric means may be used, and the specific arrangement of these means constitutes one of the essential features characterising the device of the present invention.

As illustrated in FIG. 1, the second movable guide member 15 comprises an anchoring point 21 for one end of a resilient member having its other end anchored to the buckle 12. The resilient member 20 may consist for example of a traction spring 20 pulling the movable guide member 15, or one portion of traction element 14 attached to the buckle 12 and to the winder 13, and engaged through the second guide member 15.

Figure 3:
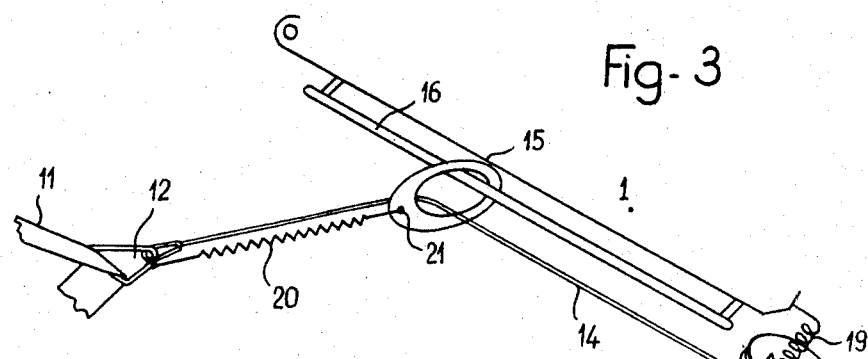
FIG. 3 is a diagrammatic illustration of a first modified form of embodiment of the device.
Figure 4:
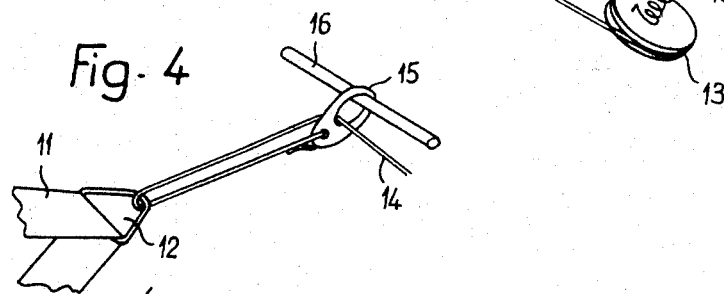
FIG. 4 is a diagrammatic illustration of a second modified form of embodiment of the device.

However, it will be noted that the distance between the buckle 12 and said member 15 increases during the door opening movement. As a consequence, the geometry of the safety harness is modified and this promotes the sliding movement. Therefore, the movement of the second guide member 15 is started by the spring 20 (FIG. 3) or simply by the traction element 14 (FIG. 4).

Figure 5:
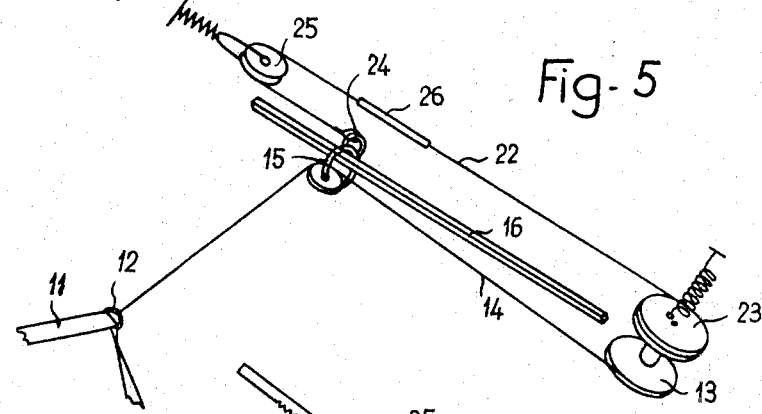
FIG. 5 is a diagrammatic illustration of a third modified form of embodiment of the device.

In the modified form of embodiment illustrated in FIG. 5 the second guide member 15 consists of a slide comprising an anchoring point 24 for the end of an auxiliary traction element such as a cable 22. This cable 22 is passed over a grooved pulley 25 and then engages a winder 23.

The two winders 13 and 23 are advantageously coaxial and the traction elements 14 and 22 are wound in opposite directions.

When opening the door 1 the traction element 14 is paid out and rotatably drives the winders 13 and 23. The auxiliary traction element 22 is wound on the winder 23 and carries along the slide 15.

It will be noted that the length of traction element 14 is adaptable to the stroke of slide 15 by properly selecting the diameters of the winders.

It would not constitute a departure from the present invention to cause the traction element 14, during its travel, to become partially or completely independent of slide 15. In this case it is only necessary to reduce the rate at which the auxiliary traction element 22 is wound on its winder 23, by including in this element 22 an elastic section 26 or interposing an elastic section between the return pulley 25 and the body, or alternatively by temporarily uncoupling the two winders from each other with the assistance of a clutch or freewheel device.

Figure 6:
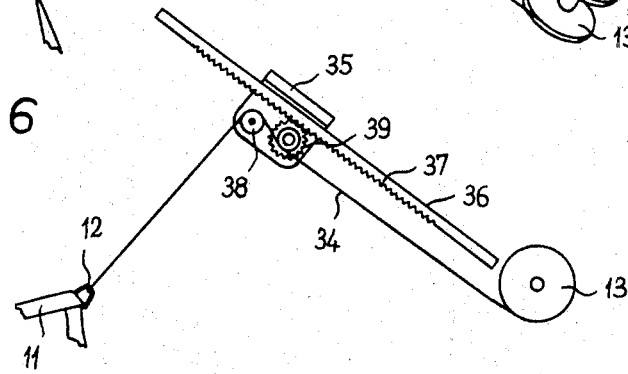
FIGS. 6 and 7 are modified forms of embodiment of the guide members.

In the example illustrated in FIG. 6, the second guide element consists of a carriage 35 adapted to slide along the slideway 36 provided with a rack section 37. A roller 38 and a pinion 39 rigid with each other are adapted to revolve freely on said carriage 35. The traction element 34 is adapted to drive the roller 38 by friction. By reacting against the rack 37, the pinion 39 pulls the carriage 35 in the direction of travel of said traction element 34.

It will be noted that the unwinding rate of the aforesaid traction element 34 in relation to the rate of translation of carriage 35 can be adjusted by properly selecting the diameters of roller 38 and pinion 39, and also the velocity of translation of carriage 35. If at the ends of rack 37 plain portions are provided for causing the loose rotation of pinion 39, the carriage 35 during its travel is stopped at the ends of said rack while permitting the winding up or paying out of said traction element.

Figure 7:
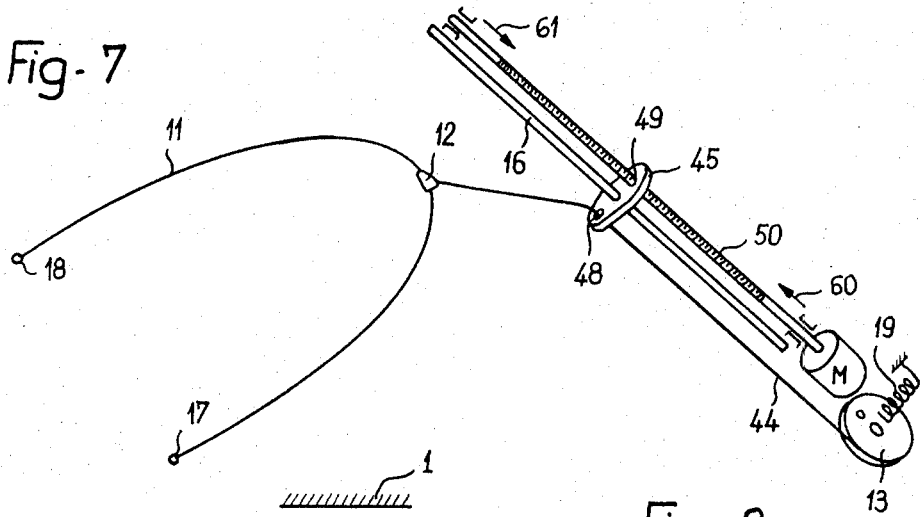

In the modified form of embodiment illustrated in FIG. 7 the carriage 45 has a through hole 48 for receiving the stress from the traction element 44. This carriage 45 is driven for translation along the guide member 16 by means of a screw-threaded shaft 50 rotatably mounted in end bearings carried by the door 1 and rotatably driven from a motor M. The carriage 45 has a tapped hole 49 engageable by and of same screw characteristics as said screw 50.

Figure 8:
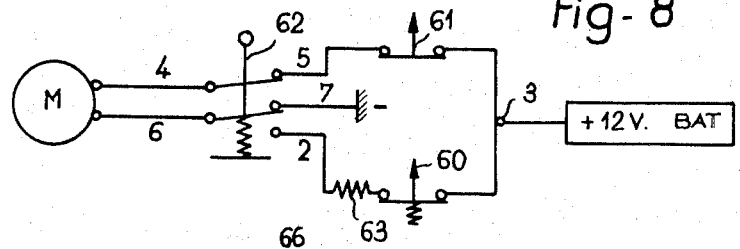
FIG. 8 is a wiring diagram applicable to the construction of the guide members illustrated in FIG. 7.

As shown in FIG. 8, the electric control circuit comprises a pair of limit switches 60, 61, a 12-Volt storage battery and a reversing switch 62 responsive to the door 1. A resistor 63 is provided for regulating the carriage speeds according to the direction of travel of carriage 45. Thus, when opening the door 1, the carriage 45 travels from 60 to 61, terminals 3, 5, 4 are energized and terminals 6, 7 are grounded.

In contrast thereto, when door 1 is closed, the terminals 6, 2, 3 are energized, and terminals 4, 7 are grounded.

It will be seen that the position of the winder is not necessarily the one illustrated; thus, it may also be secured to the seat. In this case the buckle 12 is assembled directly to the carriage 15.

Figure 9:
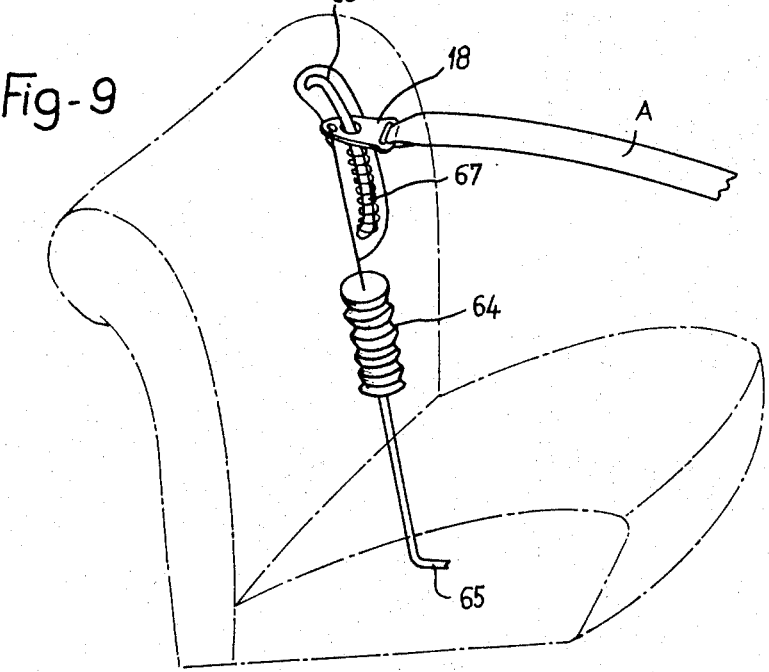
FIG. 9 is a diagrammatic illustration of the means for adapting the device to the morphological characteristics of the occupant of the vehicle seat.

Referring to FIG. 9, the upper anchoring point 18 is adjustable automatically. To this end, the anchoring point 18 is connected to a cylinder and piston unit 64 responsive to the negative pressure prevailing in the induction manifold 65 of the engine. Thus, when the engine is started the cylinder and piston unit 64 causes the anchoring point 18 to be lowered by sliding along a guide rod 66.

A spring 67 exerts an antagonistic stress on the anchoring point 18 and permits the upward movement of this point when the engine ignition is cut off.

It will readily occur to those conversant with the art that various modifications and variations may be brought to the specific forms of embodiment illustrated, described and suggested herein, without inasmuch departing from the basic principles of the invention as set forth in the appended claims.

What is claimed as new is:

1. Device for automatically retracting and repositioning safety harnesses for the passengers and driver of a motor vehicle, which comprises a safety harness proper, two anchoring points for said harness which are disposed at different levels and of which at least one is adjustable, said anchoring points being spaced laterally in relation to the adjacent door of the vehicle, a buckle adapted to slide along said harness, a traction element secured to said buckle, a device for winding said traction element, a first guide member rigid with the door of the vehicle, a second guide member movable with respect to, and guided by, said first guide member, said traction element being adapted to exert a constant tension on second guide member and to engage said sliding buckle and said second guide member, said second guide member further comprising an anchoring point and the device comprising a resilient member having its one end attached to said anchoring point on said second guide member and its other end attached to said sliding buckle.

2. Device according to claim 1, wherein the upper anchoring point of said safety harness is attached to a cylinder and piston unit responsive to the force of a return spring.

3. A device according to claim 2, wherein said cylinder and piston unit is a pneumatic motor connected to the induction manifold of the engine of the vehicle.

4. Device for automatically retracting and repositioning safety harnesses for the passengers and driver of a motor vehicle, which comprises a safety harness proper, two anchoring points for said harness which are disposed at different levels and of which at least one is adjustable, said anchoring points being spaced laterally in relation to the adjacent door of the vehicle, a buckle adapted to slide along said harness, a traction element secured to said buckle, a device for winding said traction element, a first guide member rigid with the door of the vehicle, a second guide member movable with respect to, and guided by, said first guide member, said traction element being adapted to exert a constant tension on second guide member and to engage said sliding buckle and said second guide member, said second guide member further comprising an anchoring point to which is connected an end of the traction element after the end portion of said element has successively freely engaged said second guide member and said sliding buckle.

5. Device according to claim 4, wherein the upper anchoring point of said safety harness is attached to a cylinder and piston unit responsive to the force of a return spring.

6. A device according to claim 5, wherein said cylinder and piston unit is a pneumatic motor connected to the induction manifold of the engine of the vehicle.

* * * * *